United States Patent [19]

Margraf

[11] 4,203,737
[45] May 20, 1980

[54] POCKET OR TUBE FILTERS

[76] Inventor: Adolf Margraf, Am Schleplingsbach 46, D-3060 Stadthagen Wendthagen, Fed. Rep. of Germany

[21] Appl. No.: 941,558

[22] Filed: Sep. 11, 1978

[30] Foreign Application Priority Data

Sep. 29, 1977 [DE] Fed. Rep. of Germany ....... 2743805

[51] Int. Cl.² ...................... B01D 46/04; B01D 46/42
[52] U.S. Cl. ......................................... 55/287; 55/283; 55/294; 55/317; 55/400; 55/432; 55/DIG. 25
[58] Field of Search ................. 55/270, 286, 287, 294, 55/302, 338, 341 R, 341 H, 400, 474, 482, 432, 512, 518, DIG. 25, 317, 328, 341 HM

[56] References Cited

U.S. PATENT DOCUMENTS

| 2,125,574 | 8/1938 | Knight et al. | 55/317 |
| 3,605,387 | 9/1971 | Margraf | 55/294 |
| 3,739,551 | 6/1973 | Eckert | 55/233 |
| 3,880,968 | 4/1975 | Kaspar et al. | 55/302 |
| 4,140,502 | 2/1979 | Margraf | 55/341 H |

*Primary Examiner*—David L. Lacey
*Attorney, Agent, or Firm*—Bell, Seltzer, Park & Gibson

[57] ABSTRACT

A filtering separator, in particular a pocket or tube filter, of the kind in which smoke-laden gas containing dust particles of particularly great adhesiveness is fed into a dust collecting trough of a filter housing at the bottom and upwards towards filter elements and in which the filter elements are cleaned periodically by counter-current scavenging and/or joggling. A proportion of the settling dust agglomerated in the filter which corresponds to the amount of dust in the incoming smoke laden gas and which cannot be carried back to the filter surfaces by the smoke-laden gas is removed from said dust collecting trough.

A lower part of the dust collecting trough is occupied by a longitudinally extending, rotatably mounted, perforated or sieve-like drum which is arranged to be filled with heavy bodies such as balls. The upper part of the drum is exposed and acts as a dust-collecting store or reservoir to which the smoke-laden gas is fed in order to flow transversely through the drum and its contents. At the end or below the drum there is provided an exit opening to allow the dust to drop out of the collecting trough. This opening contains a compartmented dust removal device which, together with the drum, can be set in rotation as soon as the resistance to flow through the drum reaches a maximum and which is stopped when a minimum is reached.

3 Claims, 2 Drawing Figures

POCKET OR TUBE FILTERS

BACKGROUND OF THE INVENTION

The present invention relates to filtering separators in particular pocket or tube filters, of the kind in which smoke-laden gas containing dust particles of particularly great adhesiveness is fed into a dust-collecting trough of a filter housing located at the bottom of the filter housing and then flows upwards towards filter elements, and in which said filter elements are cleaned periodically by counter-current scavenging and/or joggling, A portion of the setting dust agglomerated in said filter which corresponds to the amount of dust in the incoming smoke-laden gas and which cannot be carried back to the filter surfaces by the smoke-laden gas is removed from said dust-collecting trough. Hereinafter such apparatus will be referred to as "of the kind described".

With a filtering dust separator of the kind described it is possible, such as disclosed for example in U.S. Pat. No. 4,140,502 of the present inventor, by means of a continual feedback to the filter surfaces of the dust which settles when the filter surfaces are cleaned periodically, to bring about an agglomeration of the fine dust contained in the smoke-laden gas while it is in a floating state and downstream of the filter surfaces of the filter elements, which agglomeration increases steadily until the incoming smoke-laden gas is no longer capable of feeding further quantities of dust back to the filter surfaces, so that large agglomerated dust particles sink down through the layer of smoke-laden gas into the dust collecting trough and are removed therefrom by a screw or the like. This amount of dust corresponds to the amount of dust in the smoke-laden gas flowing into the filter. As a result of the agglomeration of the fine dust which occurs, the permeability of the layer of dust on the filter surfaces facing the smoke-laden gas is maintained until the periodic cleaning of the filter surfaces becomes necessary, and above all this makes it possible for the filter surfaces to be cleaned by counter-current scavenging and/or joggling, since very fine dust particles are prevented from remaining clinging to the filter surfaces by the agglomeration.

The above-mentioned method has proved satisfactory in practice. However, under certain circumstances very fine dust particles from smoke-laden gases, in particular particles of great adhesiveness which build up on each other and on the filter surfaces, cling to the filter surfaces or, as is often the case, remain hanging on the individual fibres of the filter surfaces in small clumps when conventional cleaning processes are used, despite the agglomeration by means of the feedback of dust, and this may lead to irreversible clogging of the filter accompanied by a steady reduction in filtering speeds and a sharp rise in the resistance of the filter to flow, which means that the filter system would have to be enlarged to a size which would not be economically practicable.

It is an object of the invention, in filtering separators such as pocket or tube filters in which there is feedback of the dust from smoke-laden gases which is to be periodically freed from the filter surfaces and fed back to the filter surfaces, to store the said dust temporarily upstream of the filter elements and thus age and pre-agglomerate it, and at the same time to make use of the fact of storage to remove the excess dust particles which occur each time the filter surfaces are cleaned and which cannot be carried back to the filter elements in the smoke-laden gas.

SUMMARY OF THE INVENTION

To achieve this object, the invention consists in a filtering separator of the kind described, wherein the lower part of the dust collecting trough is occupied by a longitudinally extending, rotably mounted, perforated or sieve-like drum which is arranged to be filled with heavy bodies and of which the upper part is exposed and which acts as a dust collecting store or reservoir and to which the smoke-laden gas is fed in order to flow transversely through the drum and its contents, an exit opening is provided in the dust collecting trough below or at the end of the drum to allow the dust to drop out of the collecting trough, which opening contains a compartmented dust removal device which, together with the drum, can be set in rotation as soon as the resistance to flow through the drum reaches a maximum and which is stopped when a minimum is reached.

In this way the tendancy of dust particles of specially great adhesiveness to collect on and between the bodies filling the drum is exploited. The at least partly agglomerated dust particles which are stored as they cling to and between the bodies lose all or at least part of their adhesiveness by a kind of ageing process. The stored dust particles which are then detached periodically from the bodies by the rotation of the drum and the rubbing of the filling bodies against one another and against the dust, travel to the filter elements in the smoke-laden gas in a pre-agglomerated and aged state and are freed periodically from the surfaces of the filter elements by cleaning and are fed back to the filter surfaces in the smoke-laden gas and further agglomerated. As a result of the temporary storage of the dust particles and the feedback of dust to the filter elements which occurs during the periods of cleaning the elements, the agglomerated dust particles are brought to a state which allows them to be detached satisfactorily from the filter surfaces in conventional fashion by counter-current scavenging and/or joggling.

As soon as the filtering separator is in a settled operating condition, a proportion of the agglomerated dust which is freed when the filter surfaces are cleaned periodically will sink down through the upwardly directly layer of smoke-laden dust into the dust collecting trough and, in accordance with the invention, will settle on the upper periphery of the drum and in part will enter the drum. (A settled operating condition is reached as soon as the flow of smoke-laden gas is no longer capable of conveying further quantities of dust back to filter surfaces.) The drum is then operated as a function of its resistance to flow, which increases to a maximum value as a result of the dust collecting on and between the bodies forming the filling, and when the maximum value is reached is set in rotation, or may even rotate continuously.

As a result of the movement of the bodies, e.g. balls, filling the drum relative to one another and to the collected dust and as a result of the swirling up the dust caused by the flow through the entire region occupied by the drum, the dust on and in the drum is brought to a state in which it is capable of flowing and while the drum is rotating is maintained in this state. Since, in accordance with the invention, an exit opening from the dust collecting trough having a compartmented removal device is situated at the end of the drum or underneath it at any desired point along its length, part of the flowing dust will flow out through the exit opening and will be removed by the removal device. In this way the invention allows any kind of special dust removal appliance, e.g. a longitudinally extending screw conveyor, to be dispensed with. As a result of dust being taken away in the region occupied by the exit opening or an extraction pipe, the dust from the other lengthwise regions of the drum continually re-distributes itself in an approximately uniform fashion along the length of the drum, so that, with the assistance of the rotation of the drum, a proportion of the dust which will correspond to the amount of dust contained in the incoming smoke-laden gas can be induced to make its exit. The other dust which is released by the rotation of the drum is continuously fed back to the filter elements in a pre-agglomerated and aged state in common with the major portion of the dust which is freed from the filter surfaces by the cleaning process.

The uniform or approximately uniform distribution of dust along the entire length of the rotor or drum is also assisted by the fact that the filter helps to even out the distribution of dust at the time of cleaning. The fact is that if, as a result of the dust removal from beneath the ball rotor or drum, a smaller amount of aged dust were initially applied to one part of the filter rather than to the other regions of the filter, the differing resistance to flow of the filter material would give rise to a tendancy for a greater amount of dust-laden gas initially to be applied to these regions of the filter and for these regions thus to be raised to the overall level of dust concentration. At the time of the subsequent periodic cleaning process the dust again falls uniformly along the entire length of the rotor.

The simplest way of restricting the amount of dust removed exactly to the amount of fresh dust continually arriving is to use the resistance of the ball rotor or drum to flow as a criterion of the extent to which it is filled with dust. The rotor can then be allowed in each case to perform a sufficient number of revolutions for its resistance to flow to remain approximately constant, i.e. to lie between two values, namely a maximum value and a minimum value.

By means of the invention, on the one hand the dust is stored temporarily and aged and pre-agglomerated, with the dust subsequently being freed from the balls by the mechanical frictional forces which occur, and at the same time the store or reservoir, namely the rotor with balls therein or the drum and its filling, is used as an appliance for removing a quantity of dust which, when the filter surfaces are cleaned periodically, cannot be fed back to the filter elements by the stream of smoke-laden gas as a result of the size to which it has agglomerated.

Also, in a further embodiment of the invention, the additional possibility exists of boosting the removal of dust when required. This is necessary when there is a very high incidence of dust and even continuous rotation of the ball rotor is no longer adequate. Bt reducing the speed of flow of the smoke-laden gas or bringing it to a complete halt in a lengthwise region of the rotor above the exit opening for the dust, the rate of inflow is reduced at this point or the inflow of smoke-laden gas is completely prevented above the dust removal pipe, as a result of which the dust remval can be boosted, i.e. the dust can be removed more quickly. Then, once the dust removal has been boosted by the measure described, the dust quota can once again be held constant within the desired limits by way of the length of the periods of rotation.

BRIEF DESCRIPTION OF THE DRAWINGS

In order that the invention may be more clearly understood, reference will now be made to the accompanying drawings which show one embodiment thereof by way of example and wherein.

DETAILED DESCRIPTION OF PREFERRED EMBODIMENT

Figure 1:
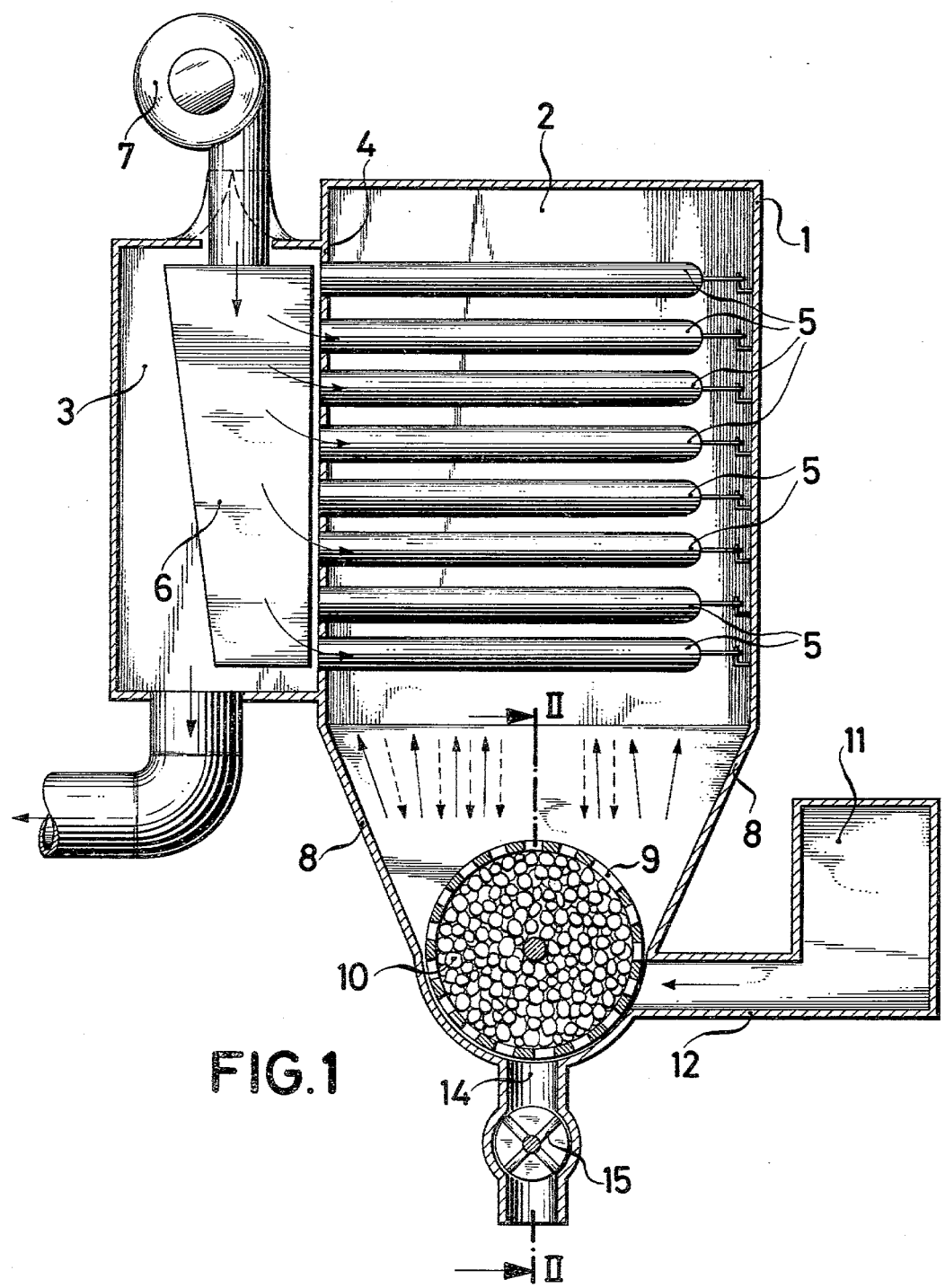
FIG. 1 is a diagrammatic cross-section through a tube filter having horizontal filter tubes.
Figure 2:
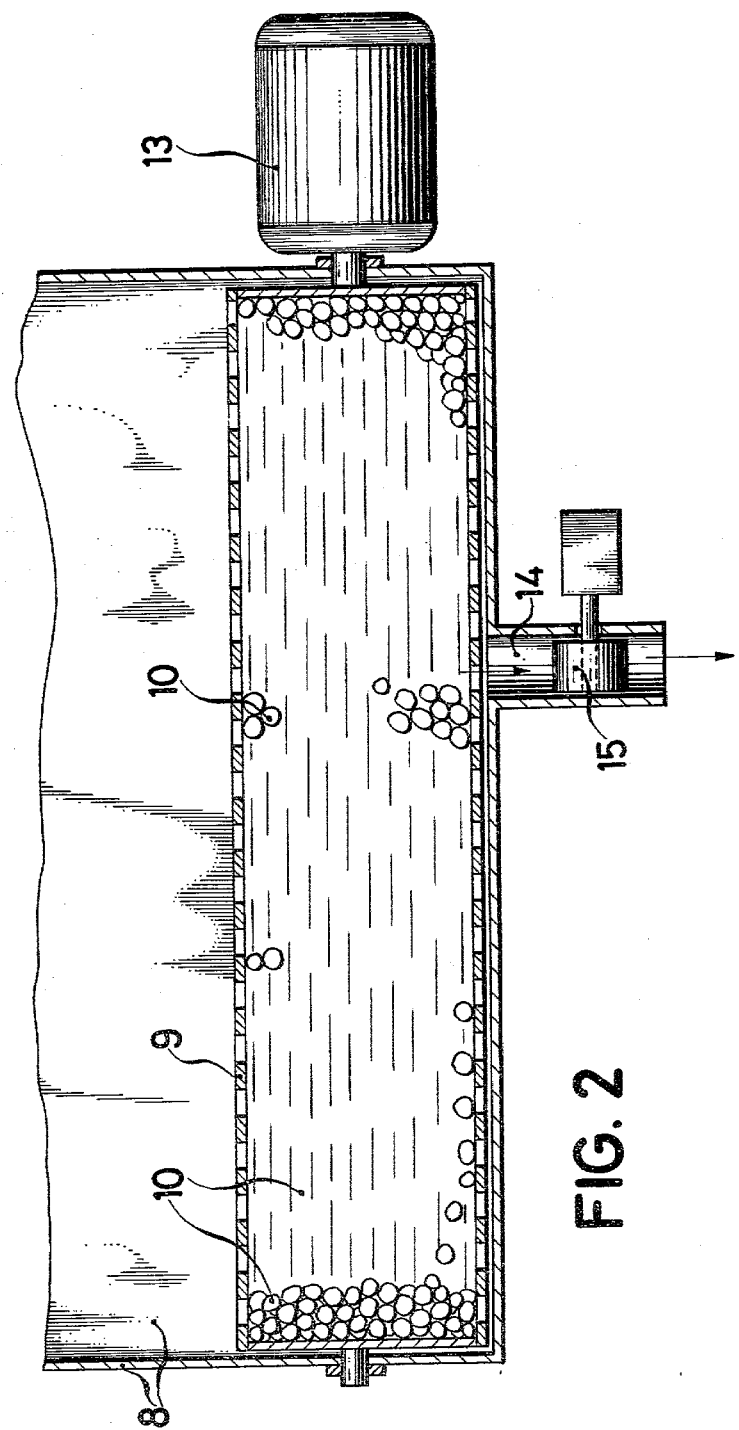
FIG. 2 is a partial longitudinal section on line II—II of FIG. 1

Referring now to the drawings, in the embodiment shown, a filter housing 1 is divided by a slotted or perforated dividing wall 4 into a dust separating space 2 and a space 3 for cleaned gas which is connected to an extractor. The dust separating space 2 contains filter tubes 5 or filter pockets which are arranged above one another in parallel rows and whose open ends are fastened in a sealed fashion to the dividing wall in such a way as to cover the perforations or slots. In the space 3 for cleaned gas is provided a slotted nozzle 6 which is connected to a scavenging blower 7 and which can be traversed to and fro periodically in the longitudinal direction in such a way that the slotted nozzle briefly coincides with each vertical row of perforations or each vertical slot in the dividing wall 4, so that the filter elements 5 can be cleaned in succession by counter-current scavenging, or possibly even by pulsed counter-current scavenging, in a widely familiar fashion.

In accordance with the invention, rather than a conventional screw feeder, a longitudinally extending sieve-like or perforated drum 9 or rotor is rotatably mounted in the known dust collecting trough 8 situated underneath the filter elements 5, this drum or rotor being filled with heavy bodies 10 of regular or irregular shape, in particular balls 10 of steel, ceramics or some other heavy material. The smoke-laden gas is fed from the side or from below to the drum along its entire length from a passage 11 via connections, e.g. flattened out connections 12, in such a way that the smoke-laden gas containing the dust particles flows transversely through the rotor along its entire length. As a result of their adhesiveness, the dust particles collect on and between the balls 10 and are stored temporarily and pre-agglomerated.

As soon as the rotor 9 with balls 10 is set in rotation by a drive means 13, the dust is freed by the rubbing action of the balls 10 and is also broken down and is then carried along by the smoke-laden gas flowing through into the upper part of the trough 8 and then up to the filter elements 5, on which it collects. This pre-agglomerated dust is periodically freed from the filter surfaces by the counter-current scavenging and is at once picked up again by the smoke-laden gas and fed back to the filter elements, so that a large amount of dust is present in and is maintained in the filter until the settled operating state is reached, which greatly promotes further agglomeration. At the time of starting up, agglomerated dust or dust from another source may be fed to the rotor 9 and balls 10 to act as nuclei for agglomeration.

When the settled operating state is reached, the smoke-laden gas can no longer carry additional dust with it to the filter surfaces so that larger dust particles then drop down through the layer of smoke-laden dust and settle on the rotor or make their way into it.

Then, once a maximum resistance to flow is reached, the rotor 9 is set in rotation so that the dust situated in it is freed from the balls 10 and broken down and is thus picked up by the smoke-laden gas and fed back to the filter surfaces 5 until a minimum resistance to flow is reached in the rotor, when the drive to the rotor is switched off so that dust can again be stored.

As a result of the rotation of the rotor and the flow through it of the smoke-laden gas, the dust in and on the rotor is brought to a state in which it swirls up and flows, so that once the settled operating state has been reached excess dust can flow out through an exit opening 14 underneath the rotor 9 and is removed by a compartmented removal device 15. In this way any other removal appliance e.g. a screw feeder, in the dust collecting space becomes superfluous.

Depending on the incidence of dust, the rotor 9 with balls 10 therein may rotate continuously or only periodically and is advantageously set in rotation or switched off by a measuring device which measures the pressure upstream and downstream of the rotor and thus the resistance which it presents to flow through it.

The way in which the rotor 9, or the drum filled with balls or the like operates has already been explained hereinbefore.

As was mentioned, when the incidence of dust is very high the rotor 9 with balls 10 may rotate continuously and when this is no longer sufficient to remove the excess dust, a lengthwise part of the rotor in the region of the exit opening 14 may be partly or completely blocked off from the inlet 11 and passageway 12 for smoke-laden gas by a shutter or the like by which means it is possible to allow a greater amount of flowing dust to flow out of the rotating rotor at this point, since the flow of smoke-laden gas is wholly or partly prevented in this region. However, in this case the distribution of dust continually adjusts itself to be uniform throughout the length of the rotor. The flowing dust may also be extracted at one end of the rotor, in which case the end-face of the rotor would have to be of a perforated form.

I claim:

1. In a filtering separator of the kind having filter elements and a dust collecting trough located therebelow, and wherein a smoke laden gas containing extremely adherent dust particles is fed into the dust collecting trough and upwardly toward the filter elements, and compressing filter cleaning means such that when the dust which settles when the filter surfaces are periodically cleaned is carried back together with the dust of the incoming smoke laden gas to the filter surfaces for agglomeration purposes, and a proportion of the agglomerated dust, corresponding to the amount of dust in the incoming smoke laden gas and which by its weight or size cannot be carried back to the filter surfaces by the smoke laden gas, being removed from said dust collecting trough; the improvement comprising a longitudinally extending rotatably mounted perforated drum having heavy bodies therein and occupying the lower portion of said dust collecting trough and positioned so that the smoke laden gas is directed into the trough and passes through said perforated drum, the upper portion of said drum being exposed for receiving the agglomerated dust loosened periodically from the filter elements and acting as a dust collecting store or reservoir, and further comprising an exit opening in the dust collecting trough below or at the end of said drum to allow dust collected in said perforated drum to drop out of said drum and to be removed from the collecting trough, said separator further comprising means to rotate said drum in order to effect removal of the dust as soon as the resistance to flow through said drum reaches a maximum and which is adapted to be stopped when a minimum resistance is reached.

2. In a filtering separator, as set forth in claim 1, in which said exit opening includes a rotatable compartmented dust removal device for effecting removal of the dust.

3. In a filtering separator, as set forth in claim 1, in which said heavy bodies comprise balls of steel, ceramic, or other heavy material.

* * * * *